Figure 1:
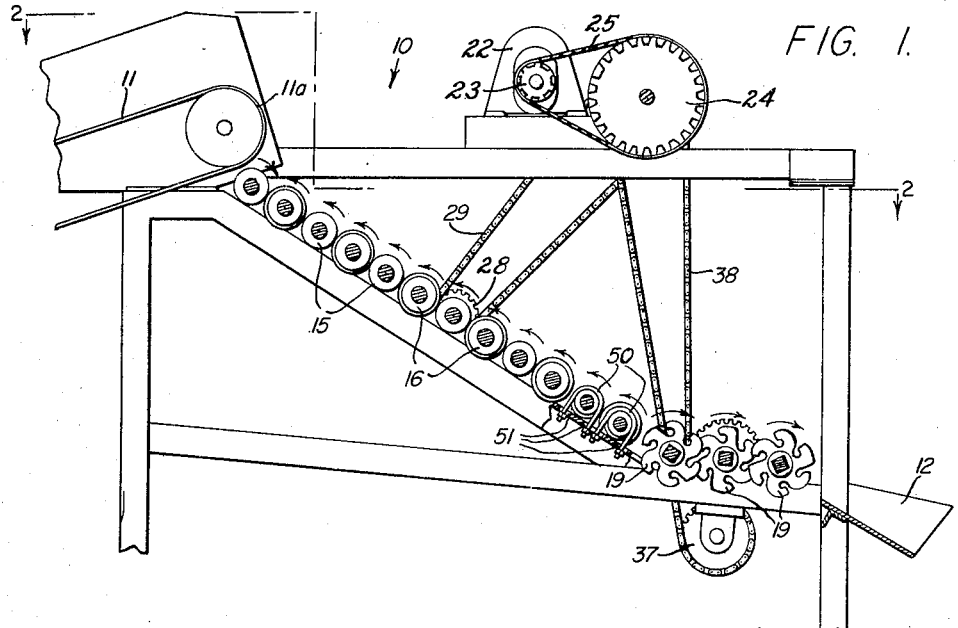

Nov. 16, 1965  J. W. SILVER ETAL  3,217,346
ROLL SCREEN FOR CLEANING ROOT CROPS
Filed July 15, 1964  2 Sheets-Sheet 1

INVENTORS
JAMES W. SILVER
JOSEPH M. SILVER
BY *Mallinckrodt and Mallinckrodt*
ATTORNEYS

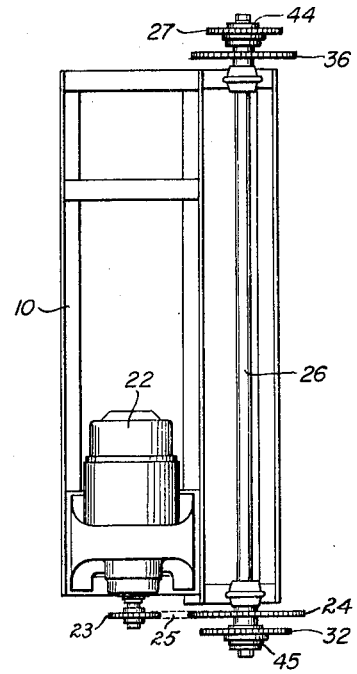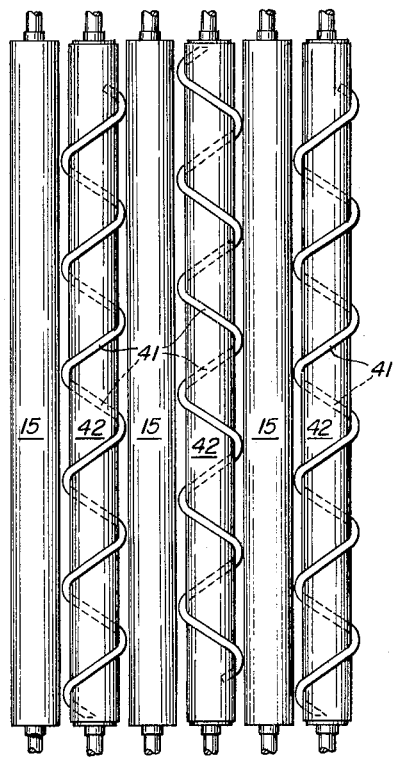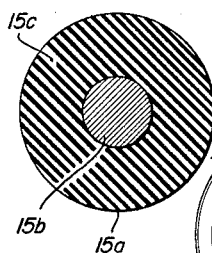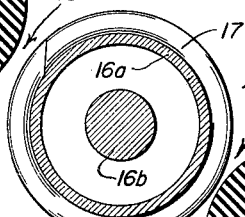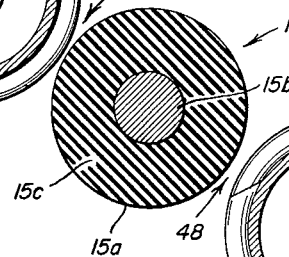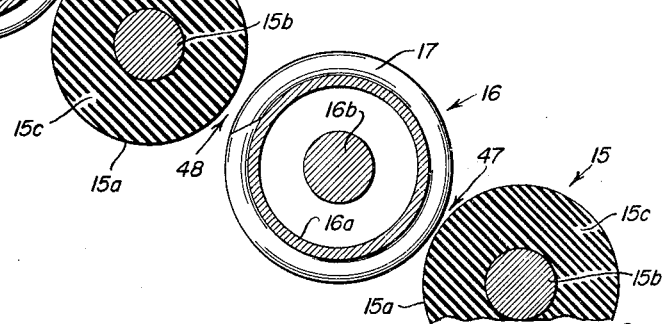

United States Patent Office 3,217,346
Patented Nov. 16, 1965

3,217,346
ROLL SCREEN FOR CLEANING ROOT CROPS
James W. Silver and Joseph M. Silver, Ogden, Utah, assignors to Ogden Iron Works Co., Ogden, Utah, a corporation of Utah
Filed July 15, 1964, Ser. No. 382,878
9 Claims. (Cl. 15—3.11)

This invention is concerned with the cleaning of root crops—primarily sugar beets—as brought from the fields following harvesting, and constitutes an improved roll screen machine for this purpose.

With sugar beets, it is important that adherent soil and accompanying loose earth and trash be separated from the beets after initial weighing of the loads brought from the fields by farmers and sold to processors, so that the net weight can be arrived at by subtracting the weight of the removed material from the gross weight.

There have been a variety of screening machines developed for cleaning sugar beets and other root crops by loosening adherent soil and stripping it from the roots as a stream of such roots pass through the machine. Machines of one type employ a series of rolls, which serve to tumble the roots as they pass, and which are spaced sufficiently far apart to permit passage therebetween of the loosened soil, small rocks, sticks, and other foreign matter from the fields, i.e. trash, without permitting passage of the roots themselves.

The more successful of these roll type machines employ shallow helical flights, scrolls, or other forms of projections wound about the circumferential surfaces of alternate rolls, so as to exercise an abrading action on mud or caked soil stubbornly adherent to the roots. Various structural and functional features and relationships of the rolls, flights, drive means therefor and feed of roots thereto have made significant differences in the performance of these machines and the character of results obtained by their use.

Principal objects in the making of the present invention were to effect such rearrangements of structure in a machine of this type as would overcome existing problems in the cleaning of sugar beets and result in improved operation.

One machine of this type that has enjoyed some commercial success in the cleaning of sugar beets is the subject of Armer U.S. Patent No. 2,604,206; another is the subject of H. F. Silver et al. U.S. Patent No. 2,976,550. The former utilizes pairs of rolls, one roll of each pair smooth faced and the other provided with a continuous helical flight, extending side-by-side and with their rotative axes aligned longitudinally with the path of travel of the roots, the flights of the several pairs extending similarly and from end to end of the particular rolls provided with same. The latter machine utilizes somewhat similar pairs of rolls extending as a series with their rotative axes disposed transversely across the path of travel of the beets, the flights or scrolls of the several pairs being discontinuous along the lengths of the particular rolls provided with same and the individual sections of such flights or scrolls being of different hand along the length of any given roll.

Although the latter arrangement appears to have some significant advantages over the former, problems exist in practice, primarily in that both the beets and trash tend to be gathered along and adjacent to the longitudinal lines of discontinuity between the flights or scrolls of opposite hand, rather than to be spread out across the width of the screen. This means that, even though there is a constant localized agitation of the beets, top screening efficiency is not achieved. Travel of the beets laterally across the screen tends to be unduly limited and trash tends to build up intermediate the width of the screen when it fails to pass through for one reason or another.

Also, though kicker type screening elements are used in combination with the series of screening rolls, they are placed as a first screening section in the overall combination, followed by the series of rolls as a second screening section. We have found that, as so arranged, this first screening section becomes plugged and ineffective under extreme mud conditions, which often exist.

Additionally, all roll screens are subject to damage by reason of oversize hard objects jamming one or more pairs of rolls and imposing sudden, heavy, torque loads on the others and on the drive mechanism.

Principal objects in the making of the present invention were to obtain maximum screening efficiency, with minimum damage to the sugar beets being screened and with minimum stress on working components of the machine if and when jamming occurs, and to obtain this at minimum cost.

Outstanding features of the invention are the arrangement of rolls and roll flights, the arrangement of kicker screen section and roll screen section of the overall screen combination, and the arrangement of drive means for the rolls.

Thus, a screen of the present invention comprises smooth-faced rolls arranged alternately with rolls having flights or scrolls projecting from and along their cylindrical faces, to provide a downwardly sloping series of rolls having their rotative axes extending transversely of the direction of feed and gravity flow of the beets. Although the flights can be continuous or discontinuous, they are of the same hand on any given roll and of opposite hand from one roll to the next roll so equipped. Moreover, the flight or flights on each roll stop short of one end of the roll on alternate sides of the screen from roll to roll so equipped. This arrangement tends to spread the beets across the width of the screen, but prevents undesirable gathering thereof at the lateral margins of the screen. It also effectively shuttles larger sized trash from side to side of the screen beneath the heavier center flow of beets and adds significantly to cleaning action.

Having a single flight or flights of the same hand on any given roll makes for ease and economy of fabrication, as well as for desirable screening action.

The top roll is smooth faced and is rotated in the downhill direction. All the rest of the rolls are rotated in the uphill direction. Thus, the top set of screening rolls is adapted to perform a drastic cleaning action at the place where the beets and trash first flow onto the screen and where the quantity of loose soil and easily-screened trash is the greatest. It is a feature of the invention that this set of rolls is located sufficiently back with respect to the forward or feed end of a belt conveyor, which carries the beets to and discharges them on the screen, that the beets and larger and heavier trash which might jam the rolls are catapulted over this first set of rolls, while the loose earth and easily screened trash tends to drop into the first set of rolls.

The smooth rollers are usually faced with a thick layer of rubber and are driven at a relatively low speed, while the flight rolls are driven at a relatively high speed.

In accordance with the invention, the rolls are driven from a single power source through separate drives provided with independent overload clutches. Thus, when there is a tendency for a set of two contiguous rolls to become jammed by trash, one of the rolls usually continues to operate and eject the offending trash, yet it is still protected against overload. Moreover, by this arrangement, there is no chance for abrupt stoppage of a high speed flight roll, with its high inertia load, from imposing damaging torque on the drive system and on the smooth rolls.

Instead of placing kicker type screening elements as a first or advance screening section at the feed end of the screen, they are placed as a second or subsequent screening section at the discharge end of the screen for receiving the beets after removal, by the roll screen section, of any mud that might be adherent thereto.

There are shown in the accompanying drawings certain embodiments of the invention representing what are presently regarded as the best modes of carrying out the generic concepts in actual practice. From the detailed description of these presently preferred forms, other more specific objects and features of the invention will become apparent.

Figure 2:
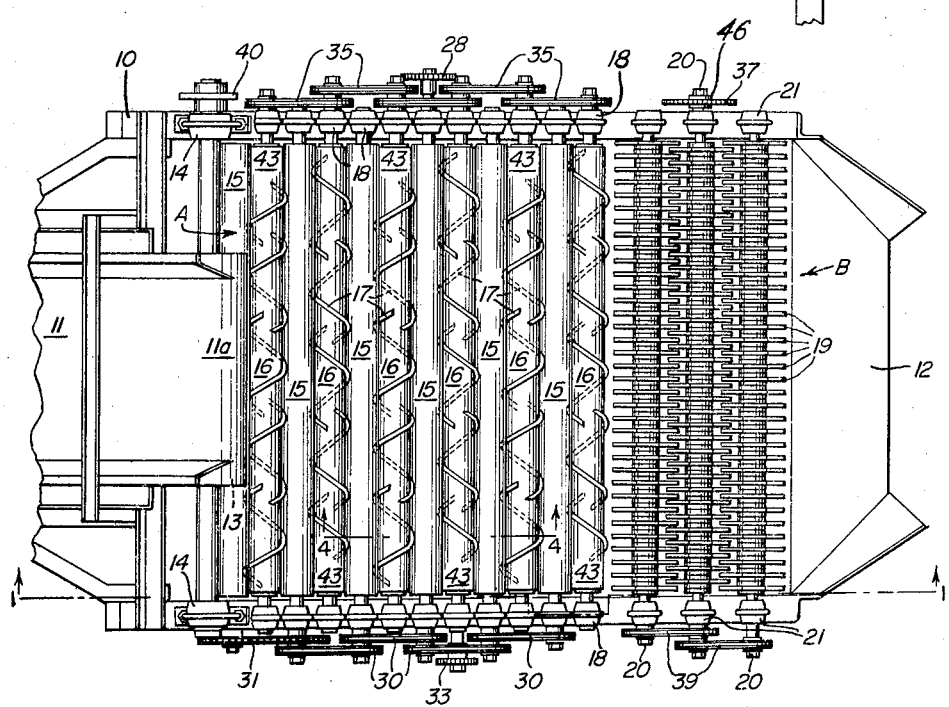

In the drawings:

FIG. 1 represents a longitudinal vertical section taken along the line 1–1 of FIG. 2 and showing the screening machine largely in side elevation, arrows being appended to indicate directions of rotation of various rotary parts, and unimportant portions of the machine being broken out for convenience of illustration;

FIG. 2, a top plan view of the screening machine as illustrated in FIG. 1, except for the removal of upper portions of structural frame and of drive components which would otherwise obscure the view of the screen proper, see the line 2—2, FIG. 1;

FIG. 3, a top plan view of the drive components and structural mounting therefor, which were removed from the showing of FIG. 2;

FIG. 4, a fragmentary, longitudinal, vertical section taken along the line 4—4 of FIG. 2 and drawn to a considerably larger scale; and FIG. 5, a fragmentary top plan view corresponding to FIG. 2, but drawn to a considerably larger scale and showing only three sets of rolls, altered in form by having continuous helical flights or scrolls, rather than the discontinuous ones of FIG. 2.

Referring to the drawings:

As illustrated in FIGS. 1–4, the screening machine comprises two screening sections, a roll screen section A and a kicker screen section B, operatively mounted in a structural framework 10 to receive sugar beets from the discharge end 11a of a standard belt conveyor 11 and to pass them to a chute 12 for disposal following screening. Conveyor 11 is driven by means of a head pulley 13, FIG. 2, provided in bearings 14.

Roll screen section A slopes downhill from feed end to discharge end, so the beets will flow by gravity onto kicker screen section B, which also preferably slopes downhill but to a much lesser degree. The axes of rotation of the screening elements of both sections extend horizontally and transversely across the flow of beets.

Roll screen section A is made up of at least two, but preferably several, sets of mutually parallel screening units, each set comprising an elongate roll 15, having a smooth cylindrical surface 15a, and a second elongate roll 16, having a helical scroll or flight 17 encircling and extending along its exterior surface. It is preferred that the smooth roll 15 be uppermost in each set, and, so that it will receive only the relatively small trash and loose earth as the beets are fed onto this screen section, the uppermost roll screen unit is located back under the discharge end 11a of feed conveyor 11 (see FIG. 1,), and is overhung by such end 11a, the beets and relatively large trash being projected beyond this first or uppermost screening unit.

The rolls are journaled for rotation in bearings 18, FIG. 2, supported by framework 10.

Kicker screen section B is of well known type. It comprises kicker elements 19 mounted side by side on a series of shafts 20 journaled for rotation in bearings 21, FIG. 2.

The screening machine is powdered by an electric gear motor 22, FIGS. 1 and 3, mounted on the framework 10 and connected by sprocket wheels 23 and 24, and by a sprocket drive chain 25 to a countershaft 26.

All except the uppermost of the smooth rolls 15 of roll screen section A are rotated in the uphill direction by a main sprocket drive, comprising sprocket wheels 27, FIG. 3, and 28, FIGS. 1 and 2, and a sprocket chain 29, and by a series of secondary sprocket drives 30, FIG. 1, respectively, FIG. 2. The uppermost smooth roll is rotated in the downhill direction by a set of spur gears 31, FIG. 2.

All the flight-provided rolls 16 are rotated in the uphill direction, at a speed several times (e.g. four times) faster than the smooth rolls 15, by a man sprocket drive comprising sprocket wheels 32, FIG. 3, and 33, FIG. 2, and a sprocket chain (not shown) and by a series of secondary sprocket drives designated 35, respectively, FIG. 2.

The kicker shafts 20 are all rotated in the downhill direction by a main sprocket drive comprising sprocket wheels 36, FIGS. 1 and 3, and 37, FIGS. 1 and 2, and a sprocket chain 38, FIG. 1, and by secondary sprocket drives 39, respectively, FIG. 2.

Belt conveyor 11 is independently driven in conventional manner by means of a sprocket drive, shown fragmentarily at 40, FIG. 2.

As can be seen in FIG. 2, the beets are ordinarily fed to the screening machine across the mid-portion of the roll screen section A. In order to obtain maximum screening efficiency in accordance with one aspect of this invention, the flight 17 of the respective rolls 16 are of alternate hand on successive rolls so provided but of the same hand along any single roll. As shown in FIG. 2, the flights are discontinuous on each roll so provided, but, as shown in FIG. 5, at 41 on the rolls 42, they can be continuous. In either instance, however, they extend from end to end of the roll except for a marginal portion 43 at one end, which is left smooth and devoid of flight (e.g. about 6½ inches for a seven foot roll). Successive flight-provided rolls 16 or 42 have their smooth ends 43 disposed at opposite sides of the screening units, so gathering of the beets at the ends of the units will be substantially avoided.

The successive rolls 15 and 16 or 42 are spaced to pass trash, but to reject beets from the flow of beets fed to the screen. The scrolls or flights 17 remove adherent mud from the beets.

It is preferred to make the smooth rolls 15 from a solid steel shaft 15b, FIG. 4, and to sheath or face the shaft with a thick layer 15c of a yieldable and resilient material, such as rubber. Typical dimensions are 2 3/16 inch diameter shaft and 1 7/8 inch thickness of rubber layer.

The flight-provided rolls 16 are advantageously made as hollow steel cylinders 16a mounted on a solid steel shaft 16b, with the scrolls or flights 17 welded to the exterior surface of the cylinders 16a. Typical dimensions are 6 inch diameter cylinder with ¾ inch deep scrolls or flights.

Because of the structural differences between these rolls and the higher rate of speed of the flight-provided rolls, it is a feature of the invention that independent overload clutch means are provided for the drives thereof. As shown in FIG. 3, overload clutches 44 and 45 of standard type are provided for the smooth rolls drive and for the flight-provided rolls drive, respectively.

It is also preferred that the kicker screen section drive be provided with a similar overload clutch 46, FIG. 2, but this is merely normal practice. The independent clutching of the mutually different rolls of the roll screen section protects against inertia loads of one roll of each set being imposed upon the other roll of each set and still enables one of the rolls of each set to continue to operate for ejecting the trash which has jammed the screen.

An advantageous optional feature of the invention is the placement of the smooth rolls 15 closer to the flight rolls 16 or 42 on the uphill side of such smooth rolls, see FIG. 4, so that the spacings 47 between such rolls on such uphill side are less than the spacings 48 on the downhill side. This enables the flight rolls, rotating downwardly toward the wider spacings 48, to carry smaller sized trash into and through such spacings, while the rubber-faced smooth rolls, traveling upwardly in this location, prevent larger sized trash and beets from being drawn down between the rolls. The narrow spacings 47 effectively prevent larger sized trash and beets from entering between the rolls, despite the down direction of rotation of the rubber-faced smooth rolls at these locations.

In order to enable the spacings between rolls to be changed, in the event this is desired, the bearings 18 journaling the stub shafts of respective flight rolls 16 or 42 are advantageously secured in place by U-bolts 50, whose legs are passed through elongate slots 51 in the framework 10 and secured in desired adjusted positions along the lengths of such slots by respective nuts.

Whereas there are here specifically set forth certain preferred procedures and apparatus which are presently regarded as the best mode of carrying out the invention, it should be understood that various changes may be made and other procedures adopted without departing from the inventive subject matter particularly pointed out and claimed herebelow.

We claim:

1. In beet screening apparatus, the combination of at least two screening units, each mounted and arranged to pass trash of variable size and to reject beets of variable size, each unit comprising an elongate roll having a smooth surface and a second elongate roll having a helical flight encircling and extending along its exterior surface, said rolls being mounted on respective, substantially horizontal axes which extend transversely to the flow of beets being screened by said units and having their peripheral surfaces spaced to pass trash and to reject beets in said flow, said helical flights being of the same hand on a single flight roll but of opposite hand on alternate flight rolls and extending from end-to-end of each of said flight rolls except for a marginal portion at one end of each such roll, which is left smooth and devoid of flight, successive flight rolls having their said smooth ends at opposite sides of said screening units.

2. The combination set forth in claim 1, wherein the flights on flight rolls are continuous along the length of each roll.

3. The combination set forth in claim 1, wherein the flights on flight rolls are discontinuous along the length of each roll.

4. The combination set forth in claim 1, wherein the uppermost roll is smooth and the screening units slope downwardly from said uppermost roll, wherein means are provided for rotating the rolls of each screening unit except the uppermost in the uphill direction; and means are provided for rotating the lower roll of said uppermost unit in the uphill direction and the upper roll of said uppermost unit in the downhill direction.

5. The combination set forth in claim 4, wherein means are provided for feeding beets onto said screening units, said means being so located with respect to the uppermost unit that the beets and relatively large trash discharged onto said screening units overshoot said uppermost unit but relatively small trash falls thereinto.

6. The combination set forth in claim 1, including drive means for rotating the smooth rolls several times faster than the flight rolls, and independent overload clutch means for the smooth rolls drive and the flight rolls drive, respectively.

7. The combination set forth in claim 6, wherein the smooth rolls are faced with a relatively thick layer of yieldable, rubber-like material.

8. The combination set forth in claim 1, wherein the smooth rolls are closer to the flight rolls on the respective uphill sides of the latter than they are on the respective downhill sides.

9. Beet screening apparatus, comprising a roll screen section and a kicker screen section, said roll screen section comprising successive screening units, each unit of which is made up of an elongate roll having a smooth surface and a second elongated roll having a helical flight encircling and extending along its exterior surface, the two rolls having their peripheral surfaces spaced apart to pass trash and to reject beets in said flow, said helical flights being of the same hand on a single flight roll, but of opposite hand on alternate flight rolls and extending from end to end of each said flight rolls except for a marginal portion at one end of each roll, which is left smooth and devoid of flight, successive flight rolls having their smooth ends at opposite sides of said screening units and said kicker screen section having individual kicker elements, the axes of rotation of the individual rolls and the individual kicker elements extending transversely to the path of flow of beets thereover and having at least the roll screen section sloping downwardly; elongate conveyor means for feeding beets onto the upper end of said roll screen section, said conveyor means having its discharge end overhanging the uppermost roll screening unit, so the discharged beets and heavier trash will overshoot said unit and the relatively small trash will fall thereinto; means for driving the uppermost roll of said unit in the downhill direction and the other roll thereof in the uphill direction; means for driving the rolls of the other roll screening units in the uphill direction, the smooth rolls at several times the speed of the flight rolls; and independent overload clutch means for the smooth rolls and the flight rolls, respectively.

References Cited by the Examiner

UNITED STATES PATENTS

| | | | |
|---|---|---|---|
| 2,565,559 | 8/1951 | Hurdelbrink | 15—3.11 |
| 2,976,550 | 3/1961 | Silver et al. | 15—3.11 |
| 2,997,086 | 8/1961 | Armer | 15—3.11 |

CHARLES A. WILLMUTH, *Primary Examiner.*

UNITED STATES PATENT OFFICE
CERTIFICATE OF CORRECTION

Patent No. 3,217,346                        November 16, 1965

James W. Silver et al.

It is hereby certified that error appears in the above numbered patent requiring correction and that the said Letters Patent should read as corrected below.

Column 6, lines 8 and 9, for "smooth rolls several times faster than the flight" read -- flight rolls several times faster than the smooth --; line 47, for "the smooth rolls at several times the speed of the flight" read -- the flight rolls at several times the speed of the smooth --.

Signed and sealed this 10th day of January 1967.

(SEAL)
Attest:

ERNEST W. SWIDER                        EDWARD J. BRENNER
Attesting Officer                            Commissioner of Patents